United States Patent
Jain et al.

(10) Patent No.: US 9,411,412 B1
(45) Date of Patent: Aug. 9, 2016

(54) CONTROLLING A COMPUTING DEVICE BASED ON USER MOVEMENT ABOUT VARIOUS ANGULAR RANGES

(71) Applicant: Amazon Technologies, Inc., Reno, NV (US)

(72) Inventors: Kritarth Jain, Seattle, WA (US); Franklin Munoz Garcia, Kirkland, WA (US); Paul Aksenti Savastinuk, Shoreline, WA (US); Timothy Andrew Ong, Sammamish, WA (US); Ross David Roessler, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 14/307,333

(22) Filed: Jun. 17, 2014

(51) Int. Cl.
*G06K 9/00* (2006.01)
*G06F 3/01* (2006.01)

(52) U.S. Cl.
CPC ..................................... *G06F 3/012* (2013.01)

(58) Field of Classification Search
None
See application file for complete search history.

(56) References Cited

U.S. PATENT DOCUMENTS

| | | | | |
|---|---|---|---|---|
| 3,178,187 | A * | 4/1965 | Cardwell | A63B 9/3608 273/DIG. 17 |
| 6,009,210 | A * | 12/1999 | Kang | G06K 9/00228 345/156 |
| 7,982,571 | B2 * | 7/2011 | Gianesello | H01F 17/0013 336/200 |
| 8,525,874 | B2 * | 9/2013 | Willmann | A61H 3/061 348/142 |
| 2010/0208045 | A1 * | 8/2010 | Willmann | A61H 3/061 348/62 |
| 2014/0211995 | A1 * | 7/2014 | Model | G06F 3/013 382/103 |
| 2015/0286295 | A1 * | 10/2015 | Pepe | G06F 3/0362 345/163 |

* cited by examiner

*Primary Examiner* — Tahmina Ansari
(74) *Attorney, Agent, or Firm* — Polsinelli LLP

(57) ABSTRACT

A computing device can be controlled based on changes in the angle of a user's head with respect to the device, such as due to the user tilting the device and/or the user tilting his head with respect to the device. Such control based on the angle of the user's head can be achieved even when the user is operating the device "off-axis" or when the device is not orthogonal and/or not centered with respect to the user. This can be accomplished by using an elastic reference point that dynamically adjusts to a detected angle of the user's head with respect to the device. Such an approach can account for differences between when the user is changing his natural resting position and/or the resting position of the device and when the user is intending to perform a gesture based on the angle of the user's head relative to the device.

20 Claims, 9 Drawing Sheets

CONTROLLING A COMPUTING DEVICE BASED ON USER MOVEMENT ABOUT VARIOUS ANGULAR RANGES

BACKGROUND

As computing devices, such as laptops, tablets, or smartphones, become increasingly sophisticated, new and interesting approaches have arisen for enabling such devices to convey information to a user and vice versa. Many such devices typically include a display element (e.g., liquid crystal display (LCD), organic light-emitting diode (OLED), electronic ink (e-ink), etc.) coupled with a touch-sensitive element (e.g., resistive, capacitive, surface acoustic wave, or infrared touchscreen, etc.) that provide for a touch-based interface. This type of interface can improve upon indirect approaches (e.g., mouse, trackpad, pointing stick, etc.) by enabling users to more directly control a computing device. For example, users can perform an action such as starting up a desired application by "clicking" or touching an icon representing the application or responding to a yes-no prompt by clicking or touching an appropriate virtual button instead of using a conventional virtual point-and-click mechanism. As computing devices become more powerful and come equipped with new sensors and other input elements, new approaches can be developed to enable users to more easily control their computing devices.

BRIEF DESCRIPTION OF THE DRAWINGS

Various embodiments in accordance with the present disclosure will be described with reference to the drawings, in which.

DETAILED DESCRIPTION

Various embodiments enable a user to control a computing device based at least in part upon the relative position of a user with respect to a computing device angle, such as a relative and/or orientation of the user, a direction of the viewing angle of the user, or the angle of the user's head relative to the computing device (e.g., the angle of incidence or a derivation thereof formed by a ray from a point corresponding to the user (e.g., a point between the user's eyes) to a point corresponding to the computing device (e.g., center point of the front surface of the computing device)), among other relative position information. For example, a first view of content may be presented to a user via a display element of the computing device. There may be additional content, contextual information, or other information that is not immediately presented on the display element, such as due to the space limitations of the display element. However, the computing device may enable the user to "peek," "scroll," or perform another movement to change the angle of the user's head relative to the device to view the associated content, such as by tilting the device from a resting position in a leftward (e.g., eastward), rightward (e.g., westward), upward (e.g., northward), downward (e.g., southward), intercardinal or ordinal (i.e., northeast (NE), southeast (SE), southwest (SW), northwest (NW)), and/or secondary-intercardinal direction (e.g., NNE, ENE, ESE, etc.), among other possible movements. Alternatively, or in addition, the user may tilt his head in one or more of the aforementioned directions, which can be recognized as input for the computing device to cause the device to perform the desired action.

In various embodiments, the actual movement of the user's head and/or the apparent movement of the user's head due to movement of the device can be detected by one or more cameras and/or one or more motion/orientation elements (e.g., accelerometer, gyroscope, digital compass, etc.) to control various functions of the device. Such an approach can reduce the use of a touch-sensitive element (e.g., resistive, capacitive, surface acoustic wave, or infrared touchscreen, etc.) of the device, and decrease fingerprints, dirt, smudges, and other remnants that may otherwise be left on the touch-sensitive element. This can reduce or eliminate the amount of glare or other issues with clarity and/or visibility. Further, control of a computing device based on head gestures or the actual or apparent movement of the user's head can be more immediately responsive of the user's intent than conventional approaches such as those requiring the user to swipe a touchscreen or push virtual buttons. In addition, control based on the angle of the user's head with respect to a computing device can enable one-handed operation or hands-free operation, which can be advantageous when the user is operating another computing device (e.g., desktop or laptop computer).

Various other functions and advantages are described and suggested below in accordance with the various embodiments.

A potential problem with utilizing movement of a user's head relative to a computing device for controlling the device is that the angle of the user's head, when the user is in a natural resting position, can vary from user to user due to variations in physical characteristics of users or differences in how users operate devices. Further, the head angle can deviate for a single user depending on the particular manner that the user happens to be operating the device. For example, in one mode of operation, the user may be operating the device by holding it relatively close to the user's face such that the user's head is substantially orthogonal and centered with respect to the front surface of the device. In another mode of operation, the user may operate the device as it lies flat on a table or to the side of the user, such as if the user is simultaneously operating a desktop computer or if the device is mounted on the dashboard of the user's vehicle. In these latter situations, the natural resting position of the user may be tilted at an angle with respect to the front surface of the computing device. A system that relied exclusively on the angle of the user's head relative to the device may mistakenly recognize the natural resting position of the user's head, when off-axis and/or not centered, as a gesture and perform an action not intended by the user.

FIGS. 1A-1D illustrate examples of a 102 user operating a computing device 104 in which the device is positioned "off-axis" or not orthogonal and/or not centered with respect to the user in accordance with various embodiments. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display element to capture image data of subject matter facing the front of the device, such as the user 102 viewing the display element. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

Figure 1A:
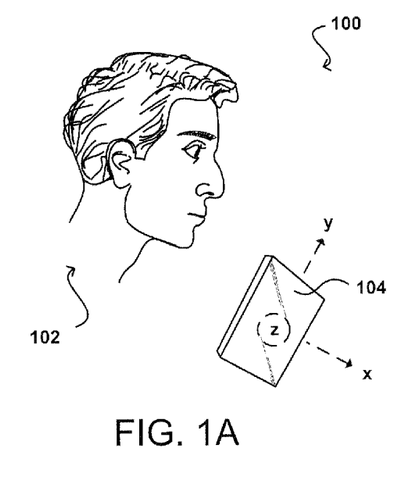
FIGS. 1A-1D illustrate example situations of a user operating a computing device as the device is positioned off-axis and/or not centered with respect to the user in accordance with various embodiments.
Figure 1B:
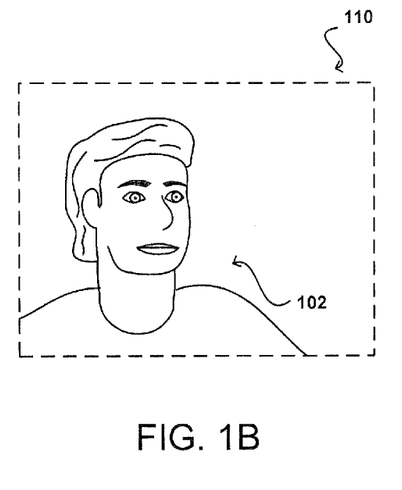

In the example situation 100 of FIG. 1A, the computing device 104 can be seen positioned such that its front face is at an angle or off-axis with respect to the user 102. For example, the user 102 may primarily be operating another computing device, such as a desktop or laptop computer, while the computing device 104 is positioned to the right and tilted with respect to the user. As another example, the computing device may be mounted within the user's vehicle and may be operated upon while the vehicle is in park. In FIG. 1B, an image 110 of the user's head facing rightward, is captured by a front-facing camera (not shown) of the computing device 104. A system that only analyzed the angle of the user's head from image 110 may mistakenly interpret that the user has performed a leftward tilt of his head and/or that the user has tilted the device leftward (i.e., rotated the device towards his left along the y-axis). Alternatively, or in addition, when the user performs an intended gesture based on a change in angle of the user's head, a conventional system may not recognize such a gesture.

Figure 1C:
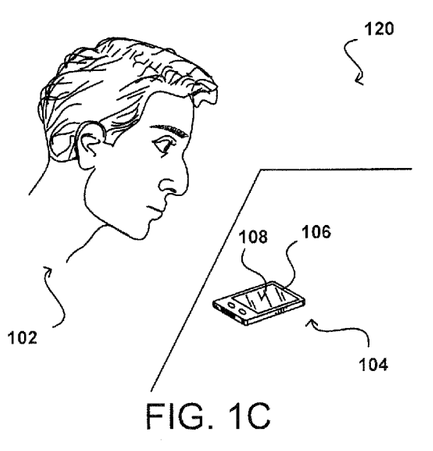
Figure 1D:
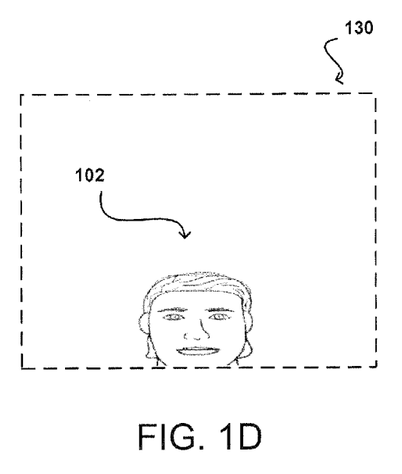

In the example situation 120 of FIG. 1C, user 102 can be seen operating computing device 104 as the device lies flat on a table. FIG. 1D illustrates an image 130 captured by front-facing camera 106 of the device from this vantage point. Image 130 includes a top portion of the head of the user 102, including the user's eyes, nose, and mouth, while cutting off a bottom portion of the user's head. Further, the user's head is at an angle or off-axis with respect to the device. A system that limited analysis to image 130 may incorrectly determine that the user has tilted his head downward or tilted the device forward. Alternatively, or in addition, such a conventional system may fail to recognize when the user performs an intended gesture while the device is operated in this manner. A robust head gesture detection system must account for instances, such as those illustrated in FIGS. 1A-1D, when the resting position of the user's head and/or the resting position of the device is off-axis or not substantially orthogonal and/or not centered with respect to each other.

Systems and approaches in accordance with various embodiments enable a relative position of the user, such as the angle of the user's head or the actual and/or apparent movement of the user's head with respect to a computing device, to be recognized as input for the computing device even when the user is positioned "off-axis" or not orthogonal and/or not centered with respect to the computing device. In various embodiments, an elastic "reference point" or "reference angle" can be used for adjusting the determination of how far the user's head has moved with respect to a computing device for controlling the device. As used herein, the "reference point" or "reference angle" is an estimate of the angle of the user's head in his natural resting position. The reference point or reference angle is determined based on an elastic function of relative position information and previous values of the reference point over time. In an embodiment, the elastic function includes weighting a difference or delta between the detected head angle and the previous value of the reference point by an elastic factor such that the reference point and the head angle converge within a specified period of time. For example, the larger the difference between a previous reference point and the detected angle of the user's head, the faster the currently determined reference point converges with the detected angle. In conjunction with the elastic reference point, a "neutral region" can be defined based on the reference point. As used herein, the "neutral region" is a fixed area around the reference point or a specified range from the reference point in which the reference point is allowed to move. That is, the reference point is bound within the limits of the neutral region, and the reference point is continuously updated when the detected angle of the user's head is within the neutral region. This dynamic adjustment of the reference point or reference angle allows the user to operate a computing device off-axis and enables the device to continue detecting changes in angle of the user's head with respect to the device for controlling the device. Such an approach can account for differences between when the user is changing his natural resting position and/or the resting position of the device and when the user is intending to control the device based on the angle of the user's head relative to the device.

Figure 2A:
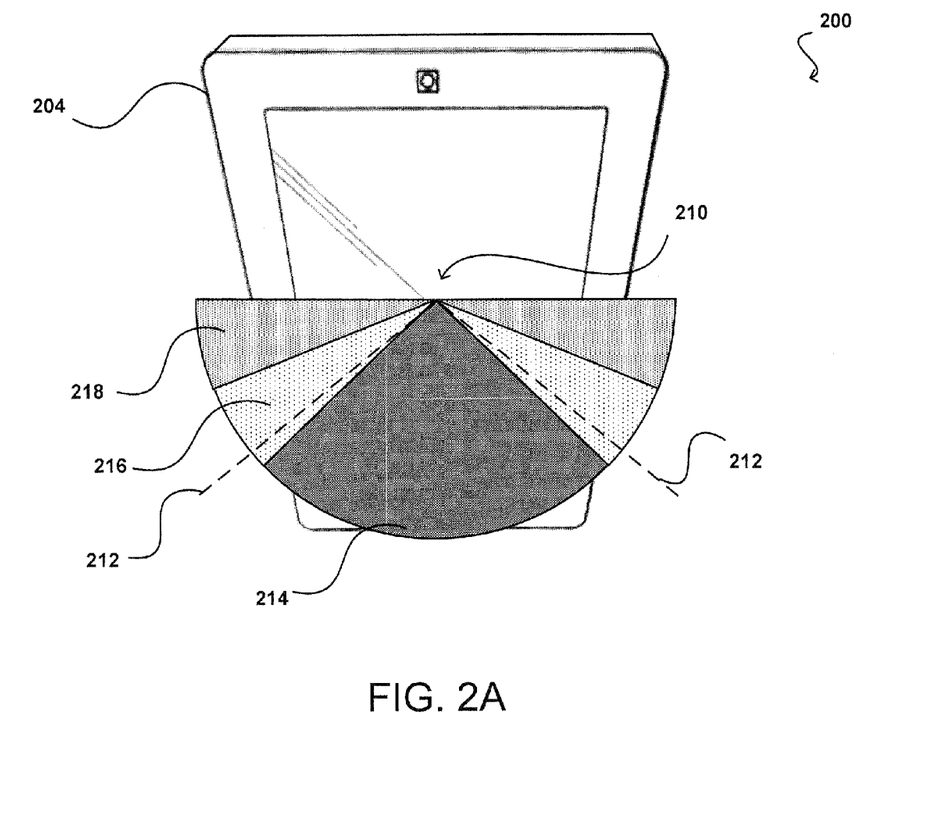
FIGS. 2A-2B illustrate example approaches for controlling a computing device based on movement of a user's head in accordance with an embodiment.
Figure 2B:
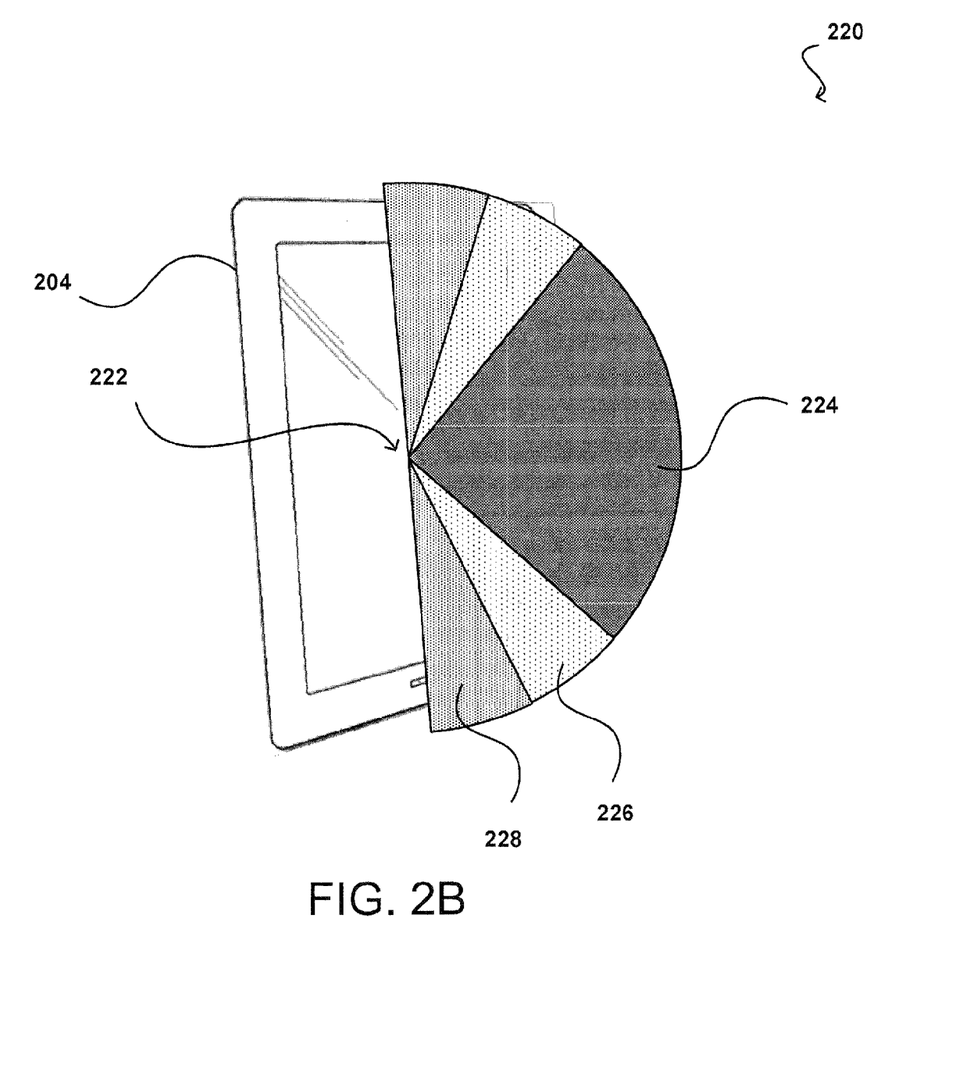

FIG. 2A-2B illustrate an example approach for controlling a computing device based on movement of a user's head with respect to the computing device in accordance with an embodiment. In this example, a reference point 210 is determined for the relative position of a user with respect to a computing device and various zones or regions are derived from the reference point. In FIG. 2A, reference point 210 is represented as a center point of a front surface of computing device 204. The inner angular region or neutral region, the area between dashed lines 212, is defined as constant angle values with respect to the reference point 210. In an embodiment, the inner angular region or neutral region is configured to be between 0 degrees and ±10 degrees with respect to the reference point. As discussed, the reference point 210 is bound inside the neutral region, and the reference point is only updated when the detected angle of the user's head is determined to be within the neutral region. The most current reference point is estimated according to an elastic function of the detected angle of the head of the user (or other relative position information) and the reference point over time. In an embodiment, the elastic function is based on weighting a delta or difference between the detected head angle and the current value of the reference point by an elastic factor such that the detected head angle and the reference point converge within a specified period of time. In an embodiment, the currently determined reference point will converge with the detected angle of the user's head after approximately 4 seconds. In operation, as the user's head moves, the reference point follows the angle of the user's head elastically. The larger the difference between a previously determined reference point and the detected angle of the user's head, the faster the current reference point converges towards the detected angle of the user's head.

FIG. 2A also illustrates various regions or zones corresponding to states for a particular gesture, a "peek" gesture or a lateral movement of the user's head, which can be used to control a computing device. In this example, the peek gesture operates according to three states—Peek Off, corresponding to the inner angular range or region 214 in FIG. 2A; Continuous Peek, corresponding to the intermediate angular range or region 216; and Peek On, corresponding to the outer angular range or region 218. Peek Off and Peek On are also defined as constant angle values with respect to the reference point 210. In an embodiment, Peek Off is configured to be between 0 degrees and ±9 degrees with respect to the reference point, Continuous Peek is configured to between ±9 degrees and 13.5 degrees, and Peek On is configured to be greater than ±13.5 degrees with respect to the reference point.

As discussed, the dynamic adjustment of the reference point allows a user to operate a computing device as the device is positioned off-axis and/or not centered with respect to the user yet still obtain expected behavior for controlling the device based on movement of the user's head. In this example, the user must move the device left or right from center at least 13.5 degrees to trigger the Peek On state. However, due in part at least to the elastic reference point, the slower the device is moved, the further the device must be moved beyond 13.5 degrees because the reference point will otherwise begin updating to converge with the detected angle of the user's head. For instance, in a particular embodiment, a 500 millisecond movement of the device may require a movement of greater than 16 degrees to achieve the Peek On state while a 1.0 second movement may require a movement of greater than 20 degrees. In an embodiment, when the user is in the Peek On state, a peek gesture in the opposite direction can be reached by moving the device about 27.0 degrees in the opposite direction in less than 500 milliseconds. Slower movements may require movements of a larger degree as the reference angle may begin updating during the period of the slower movement.

Although FIG. 2A illustrates an example of detecting movement of the user's head by using a single reference point with respect to a single x-axis or lateral axis of computing device 204, it will be appreciated that multiple reference points and/or multiple axes can be used for enabling a user to control a device via movement of the user's head in two or three dimensions. In some embodiments, a single reference point can be used with multiple axes and multiple angular ranges or regions corresponding to various states for controlling a device based on head movement. In other embodiments, multiple reference points can be used. FIG. 2B illustrates an example 220 of the operation of reference point 222 with respect to a y-axis or vertical axis of computing device 204 in accordance with an embodiment. The example approaches of FIGS. 2A-2B can each be used alone to enable control of a computing device based on movement of the user's head in one dimension (e.g., lateral movement or vertical movement) or in combination to enable control of the device based on head movement in two dimensions. In an embodiment, a third axis can be used to enable control of the device based on head movement in three dimensions. Although multiple reference points 210 and 222 are utilized in the examples of FIGS. 2A and 2B, respectively, it will be appreciated that a single reference point can be used in other embodiments. FIG. 2B also illustrates an inner angular range or region 224, an intermediate angular range or region 226, and an outer angular range or region 228. In an embodiment, inner angular range 224, intermediate angular range 226, and outer angular range 228 correspond to the states of a "scroll" gesture or a vertical movement of the user's head with respect to the computing device for controlling the device, i.e., Scroll Off, Continuous Scroll, and Scroll On, respectively. The inner angular range or region 224 corresponding to the Scroll Off state, the intermediate angular range or region 226 corresponding to the Continuous Scroll state, and the outer angular range or region 228 corresponding to the Scroll On state, are defined as constant angle values with respect to the reference point 222. In an embodiment, the inner angular range 224 is configured to be ±7.5 degrees with respect to the reference point, the intermediate angular range 226 is configured to be between ±8 degrees and ±10 degrees, and the outer angular range 228 is configured to be greater than ±10 degrees. In the example of FIG. 2B, the constant angular values for the inner angular range 224, intermediate angular range 226, and outer angular range 228 differ from those of the example of FIG. 2A. Such an approach can be advantageous as it can account for the limited vertical range of movement of the user's head relative to the lateral range of movement of the user's head. In other embodiments, the constant angle values for the various states of a head gesture can be the same across multiple axes.

Similar in operation to the approach of example 200 in FIG. 2A, the reference point 222 is bound inside the inner angular range or region 224, and the reference point is only updated when the detected angle of the user's head is determined to be within the inner angular range or region 224. The current reference point is estimated according to an elastic function the detected angle of the head of the user (or other relative position information), and previous values of the reference point over time. In an embodiment, Scroll On can enable a user to scroll through content, such as a webpage or other web-based content, a PDF, a document, a book, a collection of content (e.g., applications, music, videos, photos, etc.), a text-based list of the content, or other content, and Scroll Off can enable the user to stop scrolling of content. In an embodiment, Continuous Scroll can control the speed at which the content is scrolled with the scroll speed based on a ratio or percentage of the head angle between the Scroll On and Scroll Off states.

Figure 3:
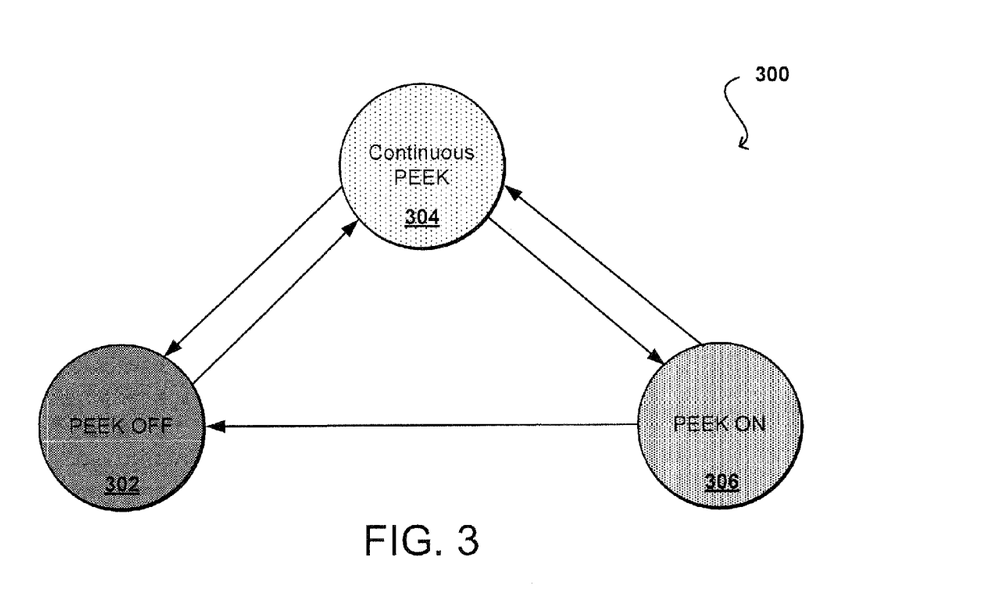
FIG. 3 illustrates an example state transition diagram for controlling a computing device based on movement of a user's head in accordance with an embodiment.

FIG. 3 illustrates an example state transition diagram 300 for operation of a peek gesture in accordance with an embodiment. In this example, the user can be determined to be in one of the aforementioned peek states—Peek Off 302, Continuous Peek 304, or Peek On 306. In the Peek Off state 302, the angle of the user's head with respect to the computing device is determined to be within the neutral region. In an embodiment, the reference point updates continuously when the user is determined to be in the Peek Off state 302 for at least 500 milliseconds. Upon a determination that the difference between the angle of the user's head with respect to the computing device and the reference point exceeds a Peek Off threshold, the user will be determined to be in the Continuous Peek state 304.

In the Continuous Peek state 304, the reference point becomes fixed and is not updated. While the user is in the Continuous Peek state 304 and the difference between the detected angle of the user's head with respect to the computing device and the fixed reference point exceeds a Peek On threshold, the user will be determined to be in the Peek On state 306. In an embodiment, the transition from the Continuous Peek state 304 to the Peek On state 306 will be recognized as a user gesture and an action corresponding to the gesture can be performed, such as displaying additional information, contextual information, or other information associated with initial content. On the other hand, if the user is in the Continuous Peek state 304 and the difference between the detected angle and the fixed reference point decreases below the Peek Off threshold, the user will be determined to be in the Peek Off state 302. In an embodiment, the transition from the Continuous Peek state 304 to the Peek Off state 302 will be recognized as a gesture and an action corresponding to the gesture can be performed, such as reverting to display of the initial content.

In an embodiment, the detected angle of the user's head in the Continuous Peek state can be used for rendering of content, such as alpha blending between a first view of content and a second view of the content with additional contextual or associated information, or an animation of one or more graphical elements. For example, the magnitude of the detected angle of the user's head can be expressed as a ratio or percentage between the Peek Off and Peek On states, and that ratio or percentage can be used to control how much of the first view of the content is to be displayed and how much of the second view of the content is to be displayed. As another example, the ratio or percentage can be used for scaling one or more graphical elements. As still another example, the ratio or percentage can be used to control animation of one or more graphical elements.

In the Peek On state 306, if the difference between the detected angle of the user's head with respect to the computing device and the reference point decreases below the Peek On threshold, the user will be determined to be in the Continuous Peek state 304. In an embodiment, if the user's head cannot be detected for more than 5 seconds, the user will be determined to be in the Peek Off state 302.

Figure 4A:
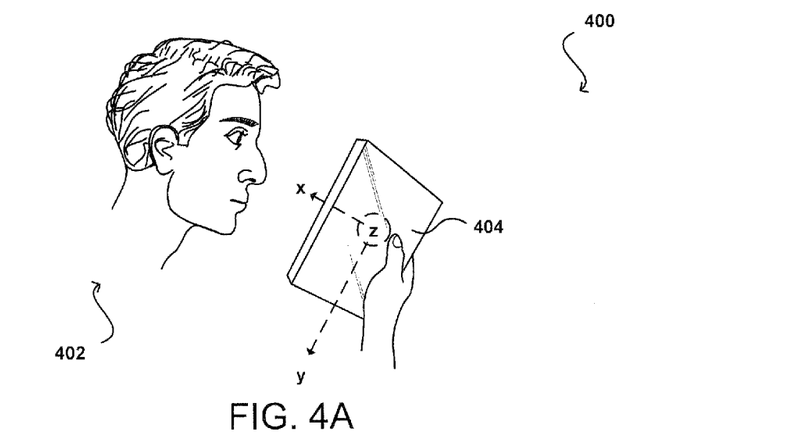
FIGS. 4A-4F illustrate an example approach for controlling a computing device based on movement of a user's head with respect to a computing device in accordance with an embodiment.
Figure 4B:
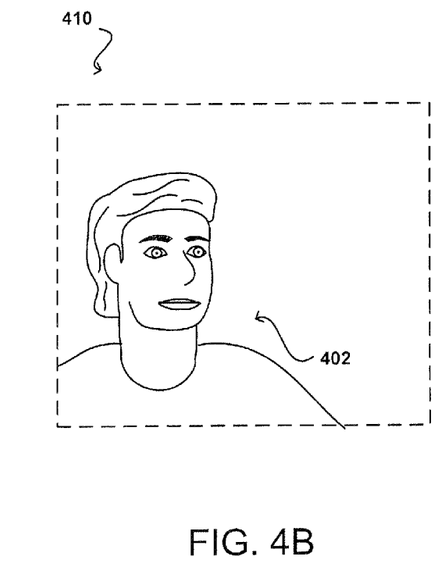

FIGS. 4A-4F illustrate an example approach for controlling a computing device based on the angle of a user's head with respect to the computing device in accordance with an embodiment. In the example situation 400 of FIG. 4A, a user 402 can be seen viewing a display element 408 of a computing device 404 as the device is positioned off-axis or tilted to the left with respect to the user in the user's natural resting position. As illustrated in FIG. 4B, when the user 402 positions the computing device in this manner, the image data captured by the front-facing camera of the device can include the image 410, a three-quarters profile of the head or face of the user facing leftward. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device.

Figure 4C:
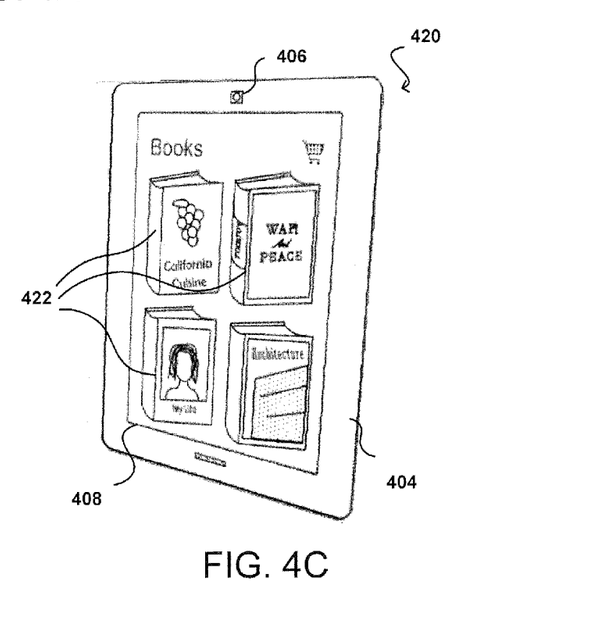
Figure 4D:
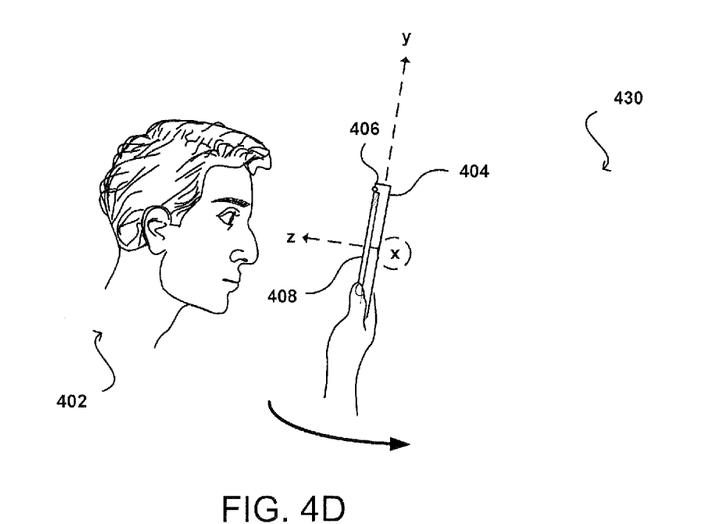
Figure 4E:
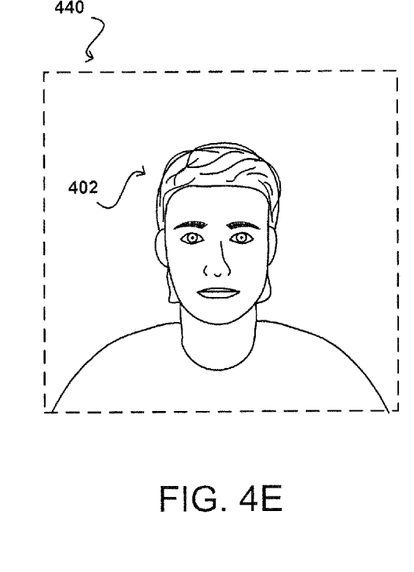

FIG. 4C illustrates an example 420 of the contents of a bookstore application presented on the display element 408 from the perspective of the user 402, including images representative of books 422 that can be purchased from an online bookstore associated with the bookstore application. In this example, the books 422 include contextual information or metadata that is not immediately presented on the display element. However, the bookstore application supports certain gestures, such as a peek gesture or a "scroll" gesture (i.e., an up and/or down movement of the user's head with respect to the device). These gestures, when performed by the user and detected by the computing device, can cause the contextual information to be displayed. Thus, in the example situation 430 of FIG. 4D, the user 402 can be seen performing a peek gesture by rotating the computing device 404 to the right with respect to the user, i.e., the user has tilted the device to his right along the longitudinal or y-axis. As shown in FIG. 4E, the tilt or rotation of the device causes the camera to capture a different view or perspective of the user within image 440, here, a full frontal view of the user. In this example, the apparent motion of the angle of the user's head (which may be primarily due to the motion of the device) can be tracked from the initial angle detected in FIG. 4B to the new angle in FIG. 4E.

Various approaches can be used to track relative position information of the user, such as the angle of the user's head, over time, including image analysis based on images captured by one or more cameras of a computing device. In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. In other embodiments, input data captured by the motion and/or orientation determination components can be analyzed in combination with images captured by one or more cameras of the device to determine angle of the user's head with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in in co-pending U.S. patent application Ser. No. 13/965,126, entitled, "Robust User Detection and Tracking," filed Aug. 12, 2013, which is incorporated herein by reference.

Figure 4F:
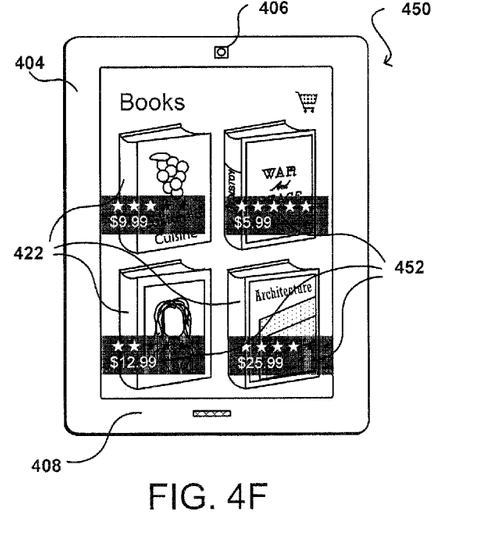

As illustrated in FIG. 4F, contextual information 452 for the books 422, such as user reviews and prices, is presented based on recognition of the peek gesture performed by the user. In this manner, the most pertinent information can be presented for a user in a default view for an application but the user may obtain additional information, contextual information, and other associated information via a peek gesture. Such an approach can be advantageous for portable computing devices whose display elements may be of limited dimensions. Further, user interfaces can be designed so as not to overload the users with too much information, which can be difficult for users to absorb in addition to increasing processing and power usage by user devices.

Figure 5A:
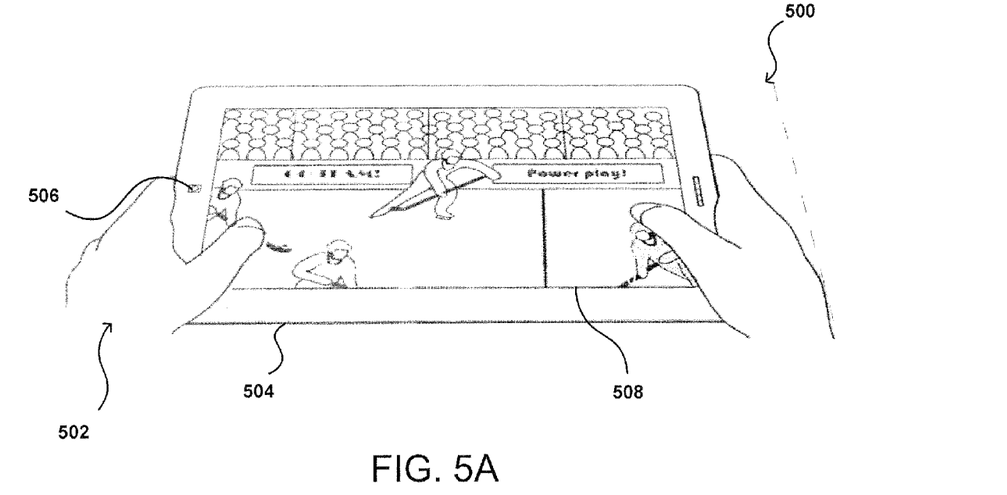
FIGS. 5A-5B illustrate an example approach for controlling a computing device based on movement of a user's head with respect to a computing device in accordance with an embodiment.
Figure 5B:
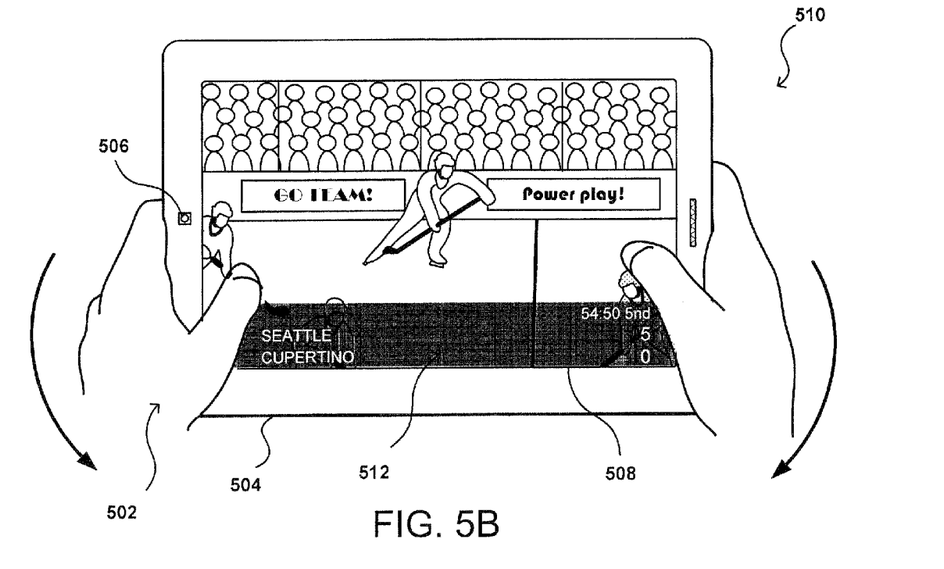

FIGS. 5A-5B illustrate an example approach for controlling a computing device based on the angle of a user's head with respect to the computing device in accordance with an embodiment. In FIG. 5A, a user 502 can be seen operating a computing device 504 to view a hockey game that is presented via a display element 508 of the device. The device 504 is positioned off-axis or tilted forward with respect to the user. As the display element 508 is of limited dimensions, contextual information associated with the hockey game is not immediately presented so as to provide the user with a fuller view of the hockey game. In this example, the viewer application that is streaming the hockey game supports gestures based on the angle of the user's head, such as a scroll gesture or an up and/or down movement of the user's head with respect to the device and/or a rotation of the device along the lateral or x-axis of the device, for displaying the contextual information associated with the hockey game. As illustrated in the example situation 510 of FIG. 5B, the user performs a scroll gesture by tilting top of the device towards himself to cause contextual information 512, the score of the hockey game and the time remaining in the game, to be displayed on display element 508. Although FIGS. 4A-4F illustrate an example of the actual or apparent lateral movement of the angle of the user's head with respect to a device and FIGS. 5A-5B illustrate an example of the actual or apparent up and/or down movement of the angle of the user's head with respect to a device, it will be appreciated that various other movements can be recognized in various embodiments, including, as discussed, movements in intercardinal or secondary-intercardinal directions, among others.

Figure 6:
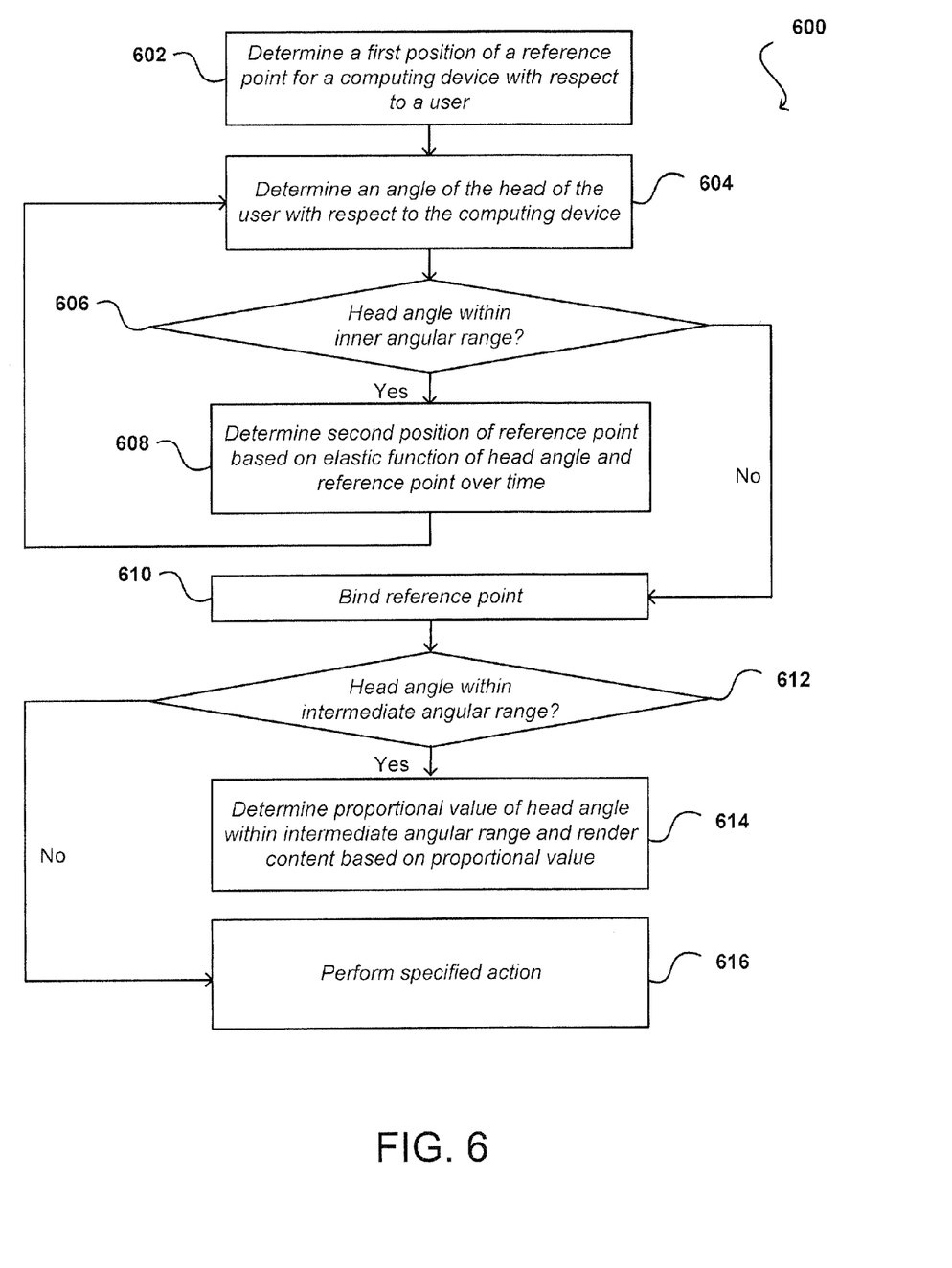
FIG. 6 illustrates an example process for controlling a computing device based on movement of a user's head with respect to the computing device in accordance with an embodiment.

FIG. 6 illustrates an example process 600 for controlling a computing device based on an angle of a user's head with respect to the computing device in accordance with an embodiment. It should be understood that, for any process discussed herein, there can be additional, fewer, or alternative steps performed in similar or alternative orders, or in parallel, within the scope of the various embodiments unless otherwise stated. The process may be initiated by powering on a computing device such as if the process is performed as part of a home screen application. In other embodiments, a user interface for an application may be based on movement of the user's head with respect to the computing device, such as the example applications illustrated in FIGS. 4A-4D or 5A-5B, and the process can be initiated by starting up the application. The process may begin by determining a first position of a reference point or reference angle of a computing device with respect to a user 602. The initial value of the reference point or reference angle can begin at zero or centered and orthogonal with respect to the user.

The process may continue by determining relative position information of the user with respect to the device, such as by detecting the angle of the user's head with respect to the computing device 604. In at least some embodiments, the relative position of the user or the angle of the user's head can be determined by analyzing one or more images captured by a camera of the device. For example, a point corresponding to the user's head, such as a point between the user's eyes, can be located within image data captured by the camera. This point forms a ray with another point corresponding to the computing device, such as a center point of a front surface of a display screen of the computing device. The head angle can be calculated based on the ray corresponding to the point of the user's head and the point of the computing device. In some embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." Robotics and Automation, IEEE Journal of 3, no. 4 (1987): 323-344, or the algorithm set forth in Zhang, Zhengyou. "A flexible new technique for camera calibration." Pattern Analysis and Machine Intelligence, IEEE Transactions on 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images generally involves feature matching. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction. One of ordinary skill in the art will appreciate that other embodiments may reconstruct 3D points from multiple 2D images, such as approaches based on calculating the trifocal tensor for three images or techniques based on the factorization algorithm or bundle adjustment for n images.

Alternatively, or in addition, other sensors, such as accelerometers, gyroscopes, magnetometers, or some combination thereof, can also be used to estimate the user's relative position. For example, when only motion/orientation sensors are used, it may be assumed that the absolute position of the user's head remains the same or substantially the same when the device is moved or its orientation changed. The motion and/or orientation of the device can be determined from the motion/orientation sensors, and the relative position of the user can be estimated from the data captured by the motion/orientation sensors based on the assumption that the user's absolute position remains the same. In other embodiments, image analysis techniques can be combined with approaches using motion/orientation sensors. These various approaches are discussed elsewhere herein or incorporated by reference herein After the relative position information of the user or the angle of the user's head with respect to the computing device is obtained, the relative position information or head angle can be compared to the reference point to determine whether the relative position or head angle is within a first specified range or inner angular range 606, such as within the thresholds of a Peek Off state (e.g., ±9 degrees) or within the bounds of a neutral region (e.g., ±10 degrees from the reference point). If the relative position or detected angle of the user's head is determined to be within the first specified range or inner angular range, a second position of the reference point can be determined based on an elastic function of the relative position information and the reference point over time 608. In an embodiment, the elastic function includes weighting a difference or delta of the detected head angle and a previous value of the reference point by an elastic factor such that the detected head angle and the reference point converge within a specified period of time. In an embodiment, the elastic factor is selected so that the reference point converges with the detected angle of the user's head in approximately 4 seconds.

If the relative position or the detected angle of the user's head is not within the first specified range or inner angular range, then the reference point becomes fixed and is not updated 610. That is, the reference point is bound to a current value of the reference point. The relative position or the detected angle of the user's head can then be compared to a second specified range or intermediate angular range 612, such as between the first specified range or inner angular range and a third specified range or outer angular range, or within the Continuous Peek state (e.g., between ±9 degrees and ±13.5 degrees). If the detected angle of the user's head is within the intermediate angular range, a proportional value of the head angle within the intermediate angular range can be determined and content can be rendered based on the proportional value 614. For instance, the rendered content can include alpha blending, based on the proportional value, of a first view of content that is initially displayed and a second view of the content when a full "peek" gesture is determined to be performed. In an embodiment, for example, if the detected head angle is measured to be 10.125 degrees or ¼ between the Peek Off and Peek On states, the content to be rendered can comprise an alpha blend of 75% of the first view of the content and 25% of the second view of the content; if the detected head angle is measured to be 11.25 degrees or ½ between the Peek Off and Peek On states, the rendered content can comprise an alpha blend at 50% of the first view of the content and 50% of the second view of the content; if the detected head angle is measured to be 12.375 degrees or ¾ between the Peek Off and Peek On states, the rendered content can comprise an alpha blend at 25% of the first view of the content and 75% of the second view of the content; etc. In another embodiment, the content can include one or more graphical elements that are scaled based on the proportional value. In yet another embodiment, the content can include one or more graphical elements that are animated based on the proportional value.

If the relative position information or the detected head angle is determined to be outside of the intermediate angular range or within a third specified range or outer angular range, such as beyond the thresholds of the Peek On state (e.g., ±13.5 degrees from the reference point), a specified action can be performed 616. For example, the action can include displaying additional information, contextual information, or other associated information of initial content, as illustrated in the examples of FIGS. 4F and 5B. After the action is performed, the relative position of the user or the angle of the user's head can continue to be detected. If the relative position of the user or the angle of the user falls back within the first specified range, it can be determined that the user intended to perform a second gesture based on the relative position of the user or angle of the user's head, and a second action corresponding to the second gesture can be performed. For instance, the second action can include reverting to the display of the initial content as illustrated in the examples of FIGS. 4C and 5A.

Figure 7:
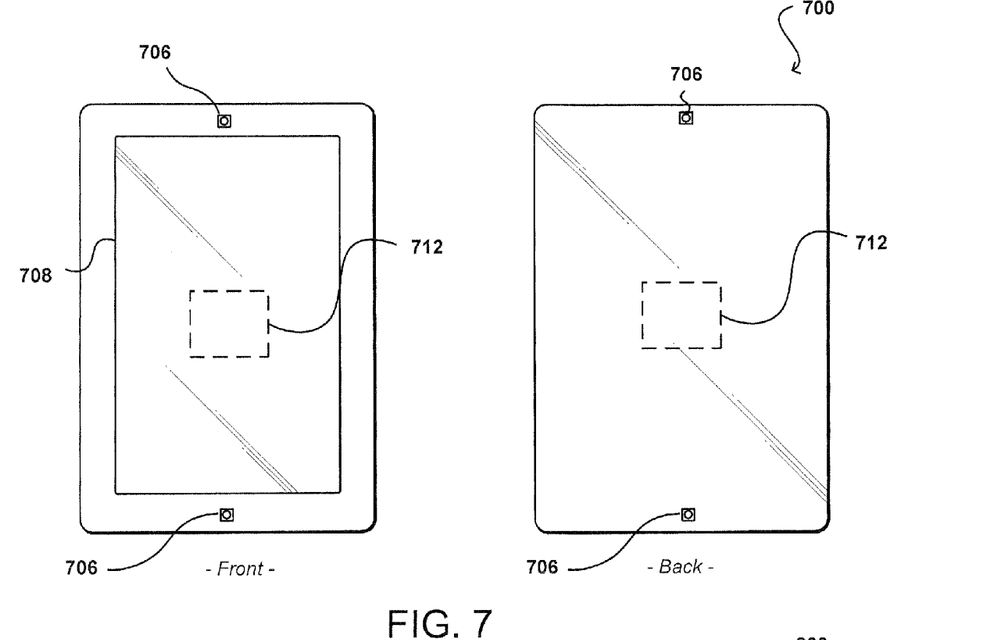
FIG. 7 illustrates an example of a computing device that can be used in accordance with various embodiments.

FIG. 7 illustrates an example computing device 700 that can be used to perform approaches described in accordance with various embodiments. In this example, the device includes two cameras 706 located at the top and bottom on each of a same and opposite side of the device as a display element 708, and enabling the device to capture images in accordance with various embodiments. The computing device also includes an inertial measurement unit (IMU) 712, comprising a three-axis gyroscope, three-axis accelerometer, and magnetometer that can be used to detect the motion and/or orientation of the device, and to facilitate head tracking in accordance with various embodiments.

Figure 8:
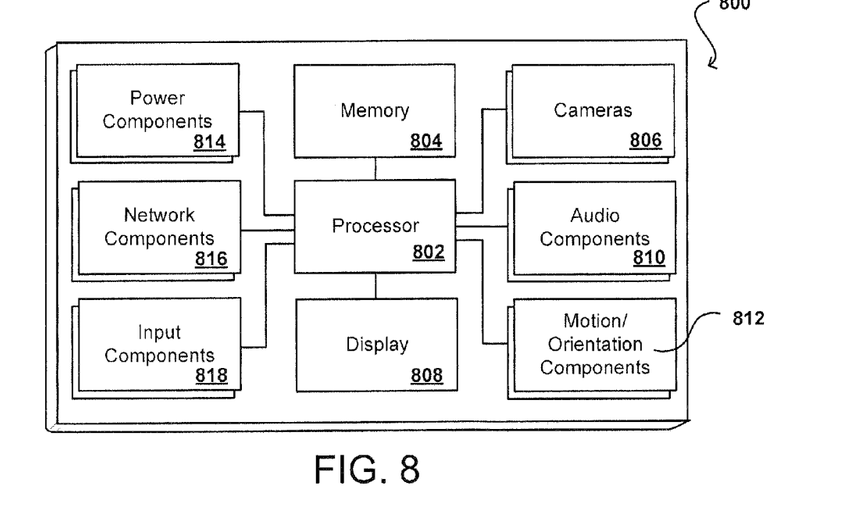
FIG. 8 illustrates an example configuration of components of a computing device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory component 804. As would be apparent to one of ordinary skill in the art, the memory component can include many types of memory, data storage, or non-transitory computer-readable storage media, such as a first data storage for program instructions for execution by the processor 802, a separate storage for images or data, a removable memory for sharing information with other devices, etc. The device typically will include some type of display element 808, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar device. The computing device can include one or more communication elements or networking sub-systems 816, such as a Wi-Fi, Bluetooth, RF, wired, or wireless communication system. The device in many embodiments can communicate with a network, such as the Internet, and may be able to communicate with other such devices. In some embodiments the device can include at least one additional input element 818 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 800 also can include one or more orientation and/or motion sensors 812. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

In some embodiments, the device 800 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 800 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 800 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions for controlling a computing device, the instructions, upon being executed by a processor of the computing device, causing the computing device to:
    determine a first position of a reference point for the computing device with respect to a user, the reference point corresponding to an estimate of a natural resting position of a head of the user with respect to the computing device;
    capture image data including a representation of the head;
    determine a first angle of the head with respect to a surface of a display screen of the computing device is within an inner angular range based at least in part by analyzing the image data;
    determine a second position of the reference point based at least in part by weighting a difference between the first angle of the head and the first position by an elastic factor such that the reference point and the first angle of the head converge within a specified period of time;
    determine a second angle of the head is within an intermediate angular range between the inner angular range and an outer angular range;
    determine a proportional value of the second angle of the head within the intermediate angular range;
    render content for display on the display screen based at least in part upon the proportional value;
    determine a third angle of the head is within the outer angular range; and
    perform a specified action.

2. The non-transitory computer-readable storage medium of claim 1, wherein the instructions, upon being executed, further cause the computing device to:

determine the second angle of the head is outside of the inner angular range; and
bind the reference point to the second position.

3. The non-transitory computer-readable storage medium of claim 2,
wherein the content includes at least one of alpha blending of first content and second content based on the proportional value, a first graphical element that is scaled based on the proportional value, or a second graphical element that is animated based on the proportional value.

4. The non-transitory computer-readable storage medium of claim 1, wherein the inner angular range, the intermediate angular range, and the outer angular range correspond to a lateral axis of the computing device, and the instructions, upon being executed, further cause the computing device to:
determine a fourth angle of the head is within a second inner angular range with respect to to a vertical axis of the computing device;
determine a third position of the reference point;
determine a fifth angle of the head is within a second outer angular range with respect to the vertical axis of the computing device; and
perform a second specified action.

5. A computer-implemented method for controlling a computing device, comprising:
determining a first position of a reference point for the computing device with respect to a user;
determining first relative position information, for a portion of the user with respect to a portion of the computing device, corresponds to an inner range;
determining a second position of the reference point based at least in part upon an elastic function, the first relative position information and the first position;
determining second relative position information, for the portion of the user with respect to the portion of the computing device, corresponds to an intermediate range between the inner range and an outer range;
determining a proportional value with respect to the intermediate range based at least in part upon the second relative position information; and
rendering content for display on a display screen of the computing device based at least in part upon the proportional value.

6. The computer-implemented method of claim 5, wherein the portion of the user is a head, the portion of the computing device is a display screen surface, the first relative position information includes a first determined angle of the head with respect to the display screen surface, the second relative position information includes a second determined angle of the head with respect to the display screen surface, and the inner range includes constant angle values with respect to the reference point.

7. The computer-implemented method of claim 5, further comprising:
capturing image data including a representation of the portion of the user,
wherein determining the first relative position information includes analyzing the image data to locate the representation of the portion of the user in the image data.

8. The computer-implemented method of claim 5, further comprising:
capturing input data from at least one of an accelerometer, a gyroscope, or a digital compass,
wherein determining the first relative position information includes analyzing the input data to estimate a movement of the computing device.

9. The computer-implemented method of claim 5,
wherein the elastic function includes weighting a delta relating to the first relative position information and the reference point by an elastic factor such that the reference point and the first relative position information correspond within a specified period of time.

10. The computer-implemented method of claim 5, further comprising:
determining the second relative position information corresponds to a position outside of the inner range; and
binding the reference point to a currently determined position of the reference point.

11. The computer-implemented method of claim 5, further comprising:
determining third relative position information corresponds to the outer range; and
performing a first specified action.

12. The computer-implemented method of claim 11, further comprising:
determining fourth relative position information corresponds to the inner range; and
performing a second specified action.

13. The computer-implemented method of claim 12, further comprising:
displaying first content on a display screen of the computing device,
wherein the first specified action includes displaying second content on the display screen and the second specified action includes displaying the first content on the display screen.

14. The computer-implemented method of claim 13,
wherein the content includes at least one of alpha blending of the first content and the second content based on the proportional value, a first graphical element that is scaled based on the proportional value, or a second graphical element that is animated based on the proportional value.

15. The computer-implemented method of claim 5, wherein the inner range corresponds to a first axis of the computing device, and the method further comprises:
determining third relative position information corresponds to a second inner range with respect, to a second axis of the computing device;
determining a third position of the reference point;
determining fourth relative position information corresponds to a second outer range with respect to the second axis of the computing device; and
performing a specified action.

16. A computing device, comprising:
a processor;
a display screen;
memory including instructions that, upon being executed by the processor, cause the computing device to:
determine a first position of a reference point for the computing device with respect to a user;
determine first relative position information, for a portion of the user with respect to a portion of the computing device, corresponds to an inner range;
determine a second position of the reference point based at least in part upon an elastic function, the first relative position information, and the first position; and
determine second relative position information, for the portion of the user with respect to the portion of the computing device, corresponds to an intermediate range between the inner range and an outer range;

determine a proportional value with respect to the intermediate range based at least in part upon the second relative position information;

render content for display on a display screen of the computing device based at least in part upon the proportional value;

determine the relative position information corresponds to the outer range; and perform a specified action.

17. The computing device of claim 16, wherein the first relative position information is based on at least one of image data including a representation of the portion of the user or input data from at least one of an accelerometer, a gyroscope, or a digital compass.

18. The computing device of claim 16, wherein the elastic function is based on weighting a delta relating to the first relative position information and the reference point based on an elastic factor such that the reference point and the first relative position information correspond within a specified period of time.

19. The computing device of claim 16, wherein the content includes at least one of alpha blending of first content and second content based on the proportional value, a first graphical element scaled based on the proportional value, or a second graphical element that is animated based on the proportional value.

20. The computing device of claim 19, wherein the inner range, the intermediate range, and the outer range correspond to a first axis of the computing device, and the instructions, upon being executed, further cause the computing device to:

determine third relative position information corresponds to a second inner range with respect to a second axis of the computing device;

determine a third position of the reference point;

determine fourth relative position information corresponds to a second outer range with respect to the second axis of the computing device; and perform a second specified action.

* * * * *